United States Patent
Denneman et al.

(10) Patent No.: US 12,086,634 B2
(45) Date of Patent: Sep. 10, 2024

(54) OPTIMIZING VM NUMA CONFIGURATION AND WORKLOAD PLACEMENT IN A HETEROGENEOUS CLUSTER

(71) Applicant: VMware, Inc., Palo Alto, CA (US)

(72) Inventors: Frank Denneman, Purmerend (NL); Duncan Epping, Helmond (NL); Cormac Hogan, County Cork (IE)

(73) Assignee: VMware LLC, Palo Alto, CA (US)

( * ) Notice: Subject to any disclaimer, the term of this patent is extended or adjusted under 35 U.S.C. 154(b) by 509 days.

(21) Appl. No.: 17/384,030

(22) Filed: Jul. 23, 2021

(65) Prior Publication Data
US 2023/0038612 A1    Feb. 9, 2023

(51) Int. Cl.
*G06F 9/50*     (2006.01)
*G06F 9/455*    (2018.01)
*G06F 9/48*     (2006.01)

(52) U.S. Cl.
CPC ........ *G06F 9/5016* (2013.01); *G06F 9/45558* (2013.01); *G06F 9/4881* (2013.01); *G06F 9/5027* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 6,075,938 A * | 6/2000 | Bugnion | ................. | G06F 9/544 719/321 |
| 10,545,778 B1 * | 1/2020 | Venkata | ............... | G06F 9/45558 |
| 2009/0077550 A1 * | 3/2009 | Rhine | ................. | G06F 9/45558 718/1 |
| 2009/0288086 A1 * | 11/2009 | Ringseth | ............... | G06F 9/4881 718/102 |
| 2012/0117299 A1 * | 5/2012 | Waldspurger | ....... | G06F 9/45558 711/E12.071 |
| 2013/0073730 A1 * | 3/2013 | Hansson | ............... | G06F 9/5077 709/226 |
| 2013/0152086 A1 * | 6/2013 | Yoo | ......................... | G06F 9/455 718/1 |
| 2013/0219389 A1 * | 8/2013 | Serebrin | ............. | G06F 9/45533 718/1 |
| 2014/0019966 A1 * | 1/2014 | Neuse | ................... | G06F 9/5077 718/1 |
| 2014/0164723 A1 * | 6/2014 | Garthwaite | ............. | G06F 9/461 711/162 |

(Continued)

*Primary Examiner* — Adam Lee
(74) *Attorney, Agent, or Firm* — Kim & Stewart LLP

(57) ABSTRACT

An example method of placing a virtual machine (VM) in a cluster of hosts is described. Each of the hosts having a hypervisor managed by a virtualization management server for the cluster, the hosts separated into a plurality of non-uniform memory access (NUMA) domains. The method including: comparing a virtual central processing unit (vCPU) and memory configuration of the VM with physical NUMA topologies of the hosts; selecting a set of the hosts spanning at least one of the NUMA domains, each host in the set of hosts having a physical NUMA topology that maximizes locality for vCPU and memory resources of the VM as specified in the vCPU and memory configuration; and providing the set of hosts to a distributed resource scheduler (DRS) executing in the virtualization management server, the DRS configured to place the VM in a host selected from the set of hosts.

20 Claims, 11 Drawing Sheets

(56) References Cited

U.S. PATENT DOCUMENTS

| | | | |
|---|---|---|---|
| 2014/0237197 A1* | 8/2014 | Gray | G06F 3/061 |
| | | | 711/153 |
| 2014/0245299 A1* | 8/2014 | Yadappanavar | G06F 9/50 |
| | | | 718/1 |
| 2015/0052287 A1* | 2/2015 | Venkatasubramanian | |
| | | | G06F 12/0891 |
| | | | 711/6 |
| 2015/0058400 A1* | 2/2015 | Parikh | G06F 1/3209 |
| | | | 709/203 |
| 2015/0169369 A1* | 6/2015 | Baskaran | G06F 9/4881 |
| | | | 718/102 |
| 2016/0085571 A1* | 3/2016 | Kim | G06F 9/48 |
| | | | 718/1 |
| 2016/0124773 A1* | 5/2016 | Gaurav | G06Q 10/04 |
| | | | 718/104 |
| 2016/0147275 A1* | 5/2016 | Weissmann | G06F 1/3206 |
| | | | 713/322 |
| 2017/0031819 A1* | 2/2017 | Venkatasubramanian | |
| | | | G06F 12/08 |
| 2017/0364279 A1* | 12/2017 | Banerjee | G06F 3/0611 |
| 2018/0373561 A1* | 12/2018 | Nassi | G06F 11/3433 |
| 2021/0132979 A1* | 5/2021 | Moffet | G06F 9/5077 |
| 2021/0173710 A1* | 6/2021 | Crossley | G06F 9/45558 |

* cited by examiner

OPTIMIZING VM NUMA CONFIGURATION AND WORKLOAD PLACEMENT IN A HETEROGENEOUS CLUSTER

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. Traditionally, a virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications. SDDCs are trending towards self-service platforms. As a result, users that do no have deep infrastructure knowledge are deploying workloads (e.g., VMs and containers) onto SDDC clusters.

Many servers in a typical SDDC are multi-socket servers having a non-uniform memory architecture (NUMA). NUMA is a shared memory architecture, where the memory access time depends on the memory location relative to the processor. With NUMA, a processor can access its own local memory faster than remote memory (memory local to another processor. For consistent performance, guest operating systems in VMs need to optimize for local memory access. The performance impact can be significant (e.g., a drop of up to 60-70%) if the virtual CPU and memory topology are misaligned with the physical topology of the underlying host. In addition, the cluster configuration composition is trending towards a heterogeneous model. Multiple host configurations with different CPU core counts and memory capacity are grouped into a cluster, making right-sizing even more challenging. Current cluster services, such as high-availability (HA) and a distributed resource scheduler (DRS), are not NUMA-aware and can trigger placement operations that impact performance. Sizing workloads to align virtual-to-physical NUMA topologies is proven to be difficult even for many infrastructure experts. With the future aimed at self-service, it is desirable for the SDDC to automatically align workloads based on NUMA architectures of heterogeneous hosts in a cluster.

SUMMARY

Embodiments relate to a method of placing a virtual machine (VM) in a cluster of hosts. Each of the hosts having a hypervisor managed by a virtualization management server for the cluster, the hosts separated into a plurality of nonuniform memory access (NUMA) domains. The method including: comparing a virtual central processing unit (vCPU) and memory configuration of the VM with physical NUMA topologies of the hosts; selecting a set of the hosts spanning at least one of the NUMA domains, each host in the set of hosts having a physical NUMA topology that maximizes locality for vCPU and memory resources of the VM as specified in the vCPU and memory configuration; and providing the set of hosts to a distributed resource scheduler (DRS) executing in the virtualization management server, the DRS configured to place the VM in a host selected from the set of hosts.

Further embodiments include a non-transitory computer-readable storage medium comprising instructions that cause a computer system to carry out the above methods, as well as a computer system configured to carry out the above methods.

DETAILED DESCRIPTION

Techniques for optimizing virtual machine (VM) non-uniform memory access (NUMA) configuration and workload placement in a heterogenous cluster are described. The techniques introduce a NUMA-aware clustering service executing in a virtualization management server for the cluster. The NUMA-aware clustering service directs a distributed resource scheduler (DRS) on initial VM placement and load-balancing decisions based on matching VIM configuration with the physical NUMA topology of the hosts in the cluster. The NUMA-aware clustering service includes a NUMA cluster topology manager configured to collect a NUMA configuration from each host to generate a NUMA domain profiles for each host. Based on the NUMA domain profiles, hosts are grouped into NUMA domains. When placing a VM in the cluster, the NUMA-aware clustering service determines optimal NUMA domain(s) for the VM given the VM's virtual central processing unit (vCPU) count and memory configuration. The NUMA-aware clustering service can also consider initial placement restrictions and admission controls established by the user when determining the optimal NUMA domain(s). The NUMA-aware clustering service generates a list of hosts in the optimal NUMA domain(s) and provides the list to the DRS. The DRS then places the VM based on VM configuration and resource reservation data but confined to hosts in the list provided by the NUMA-aware clustering service. When load-balancing a VM in the cluster, the NUMA-aware clustering service functions similarly and provides a host list to DRS. DRS selects a destination host for the VM selected from the provided host list. These and further aspects of the techniques are described below with respect to the drawings.

Figure 1:
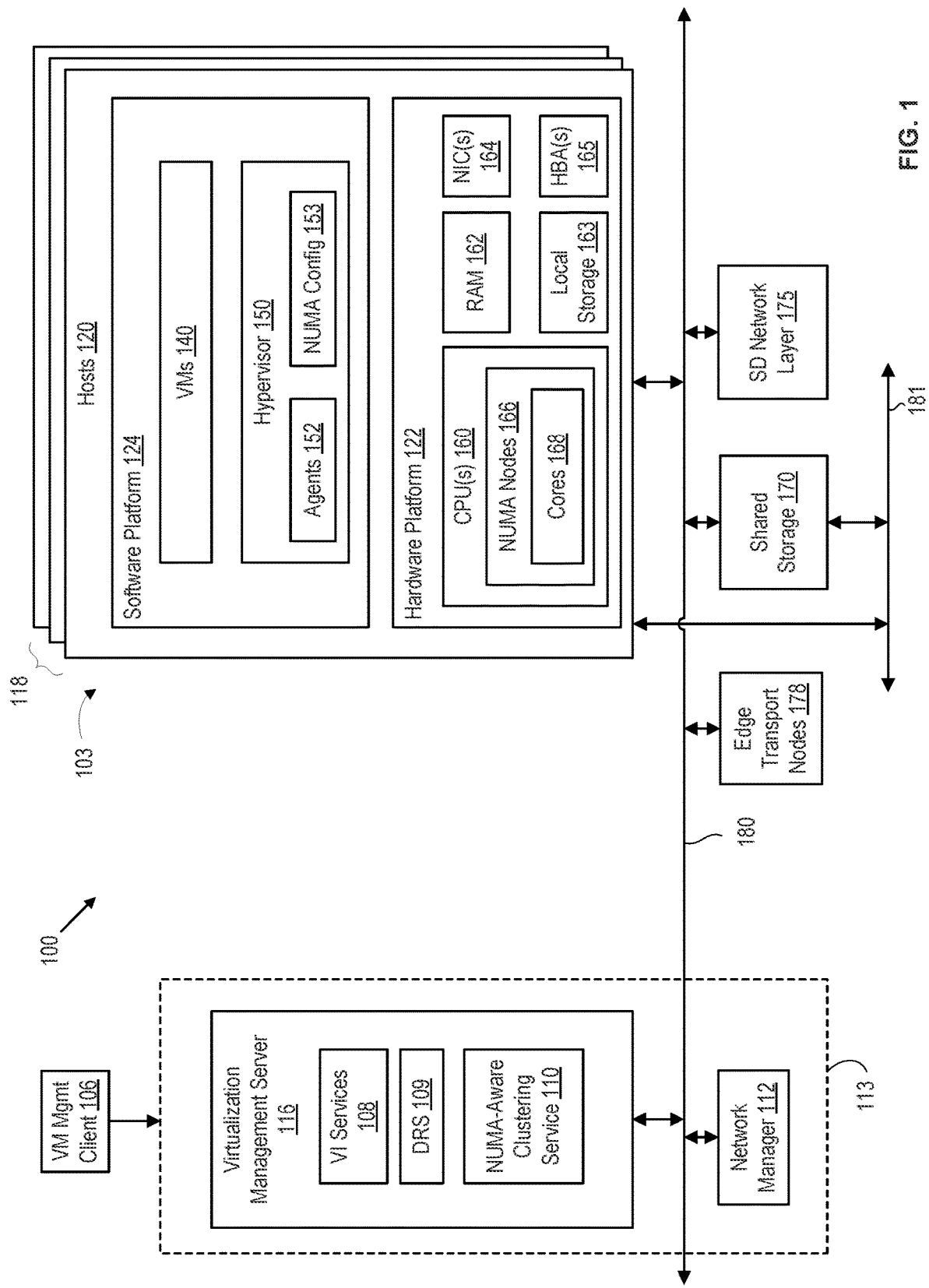
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, one or more host bust adaptors (HBAs) 165, and optionally local storage 163. CPUs 160 are configured to execute instructions, for example, executable instructions that perform one or more operations described herein, which may be stored in RAM 162. CPU(s) 160 include a plurality of NUMA nodes 166. Each NUMA node 166 includes a set of cores 168 coupled to a set of RAM 162.

Figure 2:
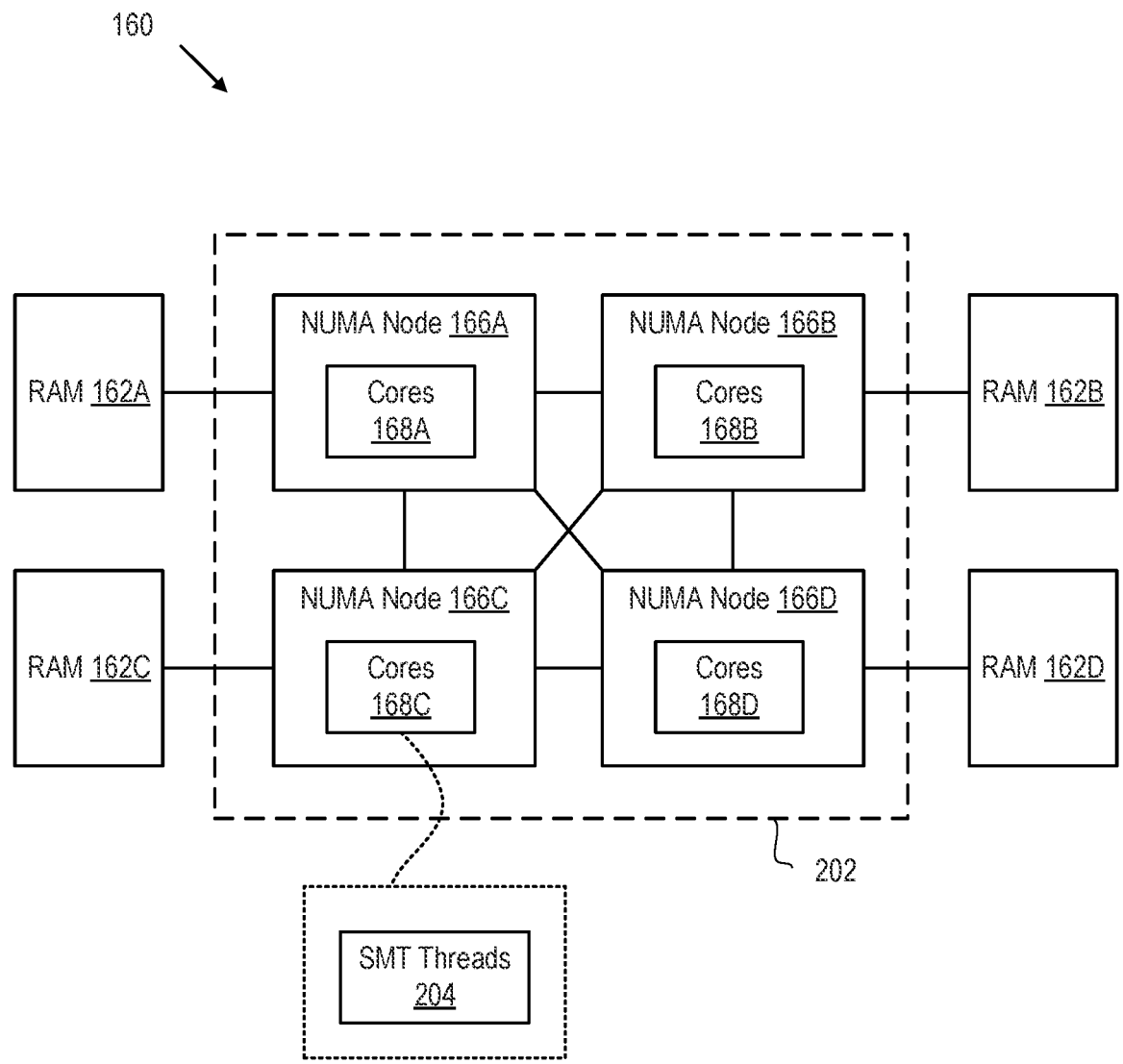
FIG. 2 is a block diagram depicting CPU(s) of a host computer according to embodiment.

FIG. 2 is a block diagram depicting CPU(s) 160 according to embodiment. In the example, CPU(s) 160 include four NUMA nodes 166 designated NUMA nodes 166A, 166B, 166C, and 166D. NUMA nodes 166A-D includes core sets 168A, 168B, 168C, and 168D, respectively. NUMA nodes 166A-D access sets of RAM 162A, 162B, 162C, and 162D, respectively. NUMA nodes 166A-D are interconnected with one another such that each NUMA node can access each other NUMA node. NUMA nodes 166 are implemented on one or more physical sockets 202 (e.g., physical integrated circuits). For example, the four NUMA nodes 166A-D can be implemented using four physical sockets 202. Some types of CPUs can have multiple NUMA nodes on one physical socket. Hence, in another example, the four NUMA nodes 166A-D can be implemented using two physical sockets 202 or one physical socket 202. In embodiments, CPU(s) 160 support simultaneous multithreading (SMT) on cores 168. Thus, each core 168 can be configured with hardware multithreading. A core 168 with SMT enabled can have multiple threads executing concurrently (e.g., instructions from more than one thread can be executed in any given pipeline stage at a time). In embodiments, vCPUs of a VM can be SMT threads on a core 168 (e.g., a core 168 having an SMT value of two can support two vCPUs). SMT threads can be referred to herein as logical CPUs.

Returning to FIG. 1, NICs 164 enable host 120 to communicate with other devices through a physical network 180. Physical network 180 enables communication between hosts 120 and between other components and hosts 120.

In the embodiment illustrated in FIG. 1, hosts 120 can access shared storage 170 by using NICs 164 to connect to network 180. In addition, or alternatively, hosts 120 can access shared storage 170 using HBAs 165 connected to a separate network 181 (e.g., a fibre channel (FC) network), Shared storage 170 include one or more storage arrays, such as a storage area network (SAN), network attached storage (NAS), or the like. Shared storage 170 may comprise magnetic disks, solid-stale disks (SSDs), flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. Hypervisor 150 retrieves and maintains a NUMA configuration 153 of its respective host 120. NUMA configuration 153 can include the number of cores per NUMA node, the capacity of memory per NUMA node, the total number of NUMA nodes, and the like. One example of hypervisor 150 that may be configured and used in embodiments described herein is a VMware ESXi™ hypervisor provided as part of the VMware vSphere® solution made commercially available by VMware, Inc. of Palo Alto, CA. An embodiment of software platform 124 is discussed further below with respect to FIG. 3.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs.

Virtualization management server 116 is a physical or virtual server that manages host cluster 118 and the virtualization layer therein. Virtual ration management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs.

Network manager 112 installs additional agents 152 in hypervisor 150 to add a host 120 as a managed entity, referred to as a transport, node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA. If network manager 112 is absent, virtualization management server 116 can orchestrate SD network layer 175.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108, distributed resource scheduler (DRS) 109, and NUMA-aware clustering service 110. VI services 108 include various virtualization management services, such as high-availability (HA) service, single sign-on (SSO) service, virtualization management daemon, vSAN service, and the like. DRS 109 is configured to aggregate the resources of host cluster 118 to provide resource pools and enforce resource allocation policies. DRS 109 also provides resource management in the form of load balancing, power management, VM placement, and the like. In embodiments, DRS 109 is not NUMA-aware and does not consider the NUMA configurations of hosts 120 when making placement and load-balancing decisions for VMs. However, NUMA-aware clustering service 110 is provided to understand and account for such NUMA configurations 153 of hosts 120. For each VM placement or load-balancing decision, NUMA-aware clustering service 110 selects an optimal set of hosts in which the VM can be placed or moved. NUMA-aware clustering service 110 provides a list of hosts to DRS 109, which then places/moves the VM on one of the hosts in the list. The functionality of NUMA-aware clustering service 110 is discussed further below.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like. In embodiments, a user can also configure aspects of NUMA-aware clustering service 110 through VM management client 106.

Figure 3:
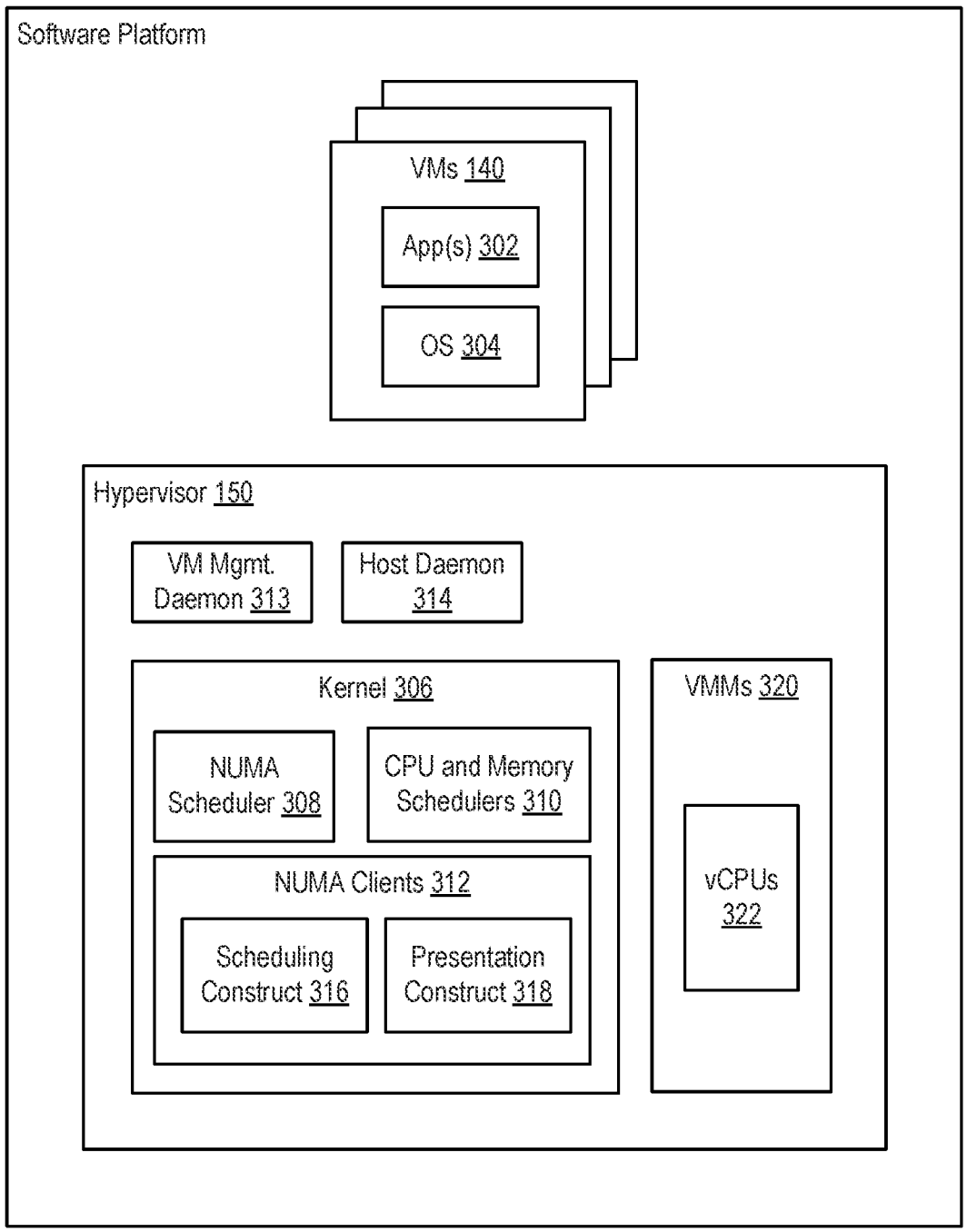
FIG. 3 is a block diagram depicting a software platform executing on a host computer according an embodiment.

FIG. 3 is a block diagram depicting software platform 124 according an embodiment. As described above, software platform 124 of host 120 includes hypervisor 150 that supports execution of VMs 140. In an embodiment, hypervisor 150 includes a kernel 306, VM management daemon 313, a host daemon 314, and virtual machine monitors (VMMs) 320. VM management daemon 313 is an agent 152 installed by virtualization management server 116. VM management daemon 313 provides an interface to host daemon 314 for virtualization management server 116. Host daemon 314 is configured to create, configure, and remove VMs 140. Each VM 140 has applications (apps 302) running therein on top of an OS 304 (also referred to as a guest OS).

Kernel 306 provides operating system functionality (e.g., process creation and control, file system, process threads, etc.), as well as CPU scheduling and memory scheduling across VMs 120, VMMs 320, management daemon 313, and a host daemon 314 (among other modules not shown). VMMs 320 implement the virtual system support needed to coordinate operations between hypervisor 150 and VMs 120. Each VMM 320 manages a corresponding virtual hardware platform that includes emulated hardware, such as virtual CPUs (vCPUs) 322 and guest physical memory (also referred to as VM memory). Each virtual hardware platform supports the installation of guest software in a corresponding VM 120. Each VMM 320 can include a separate process for each vCPU 322 assigned to a VM 120, which is responsible for virtualizing guest OS instructions and managing memory.

Kernel 306 includes a NUMA scheduler 308 and CPU and memory schedulers 310. NUMA scheduler 308 is configured to optimize resource locality for each VM 140 and NUMA nodes 166 load balance. CPU and memory schedulers 310 are configured to perform resource allocation of physical CPU and memory resources among VMs 140. When a VM 140 powers on, NUMA scheduler 308 creates one or more NUMA clients 312 based on the number of vCPUs 322 allocated to the VM and the physical NUMA topology of host 120.

For example, NUMA scheduler 308 can configure a VM with ten vCPUs 322 powered on a host 120 with ten cores 168 per NUMA node 166 ($CPN^2$) with a single NUMA client 312 to maximize resource locality. This type of configuration is referred to herein as a narrow VM configuration (also referred to as narrow VM placement, narrow VW, or NVM configuration/placement). In another example, NUMA scheduler 308 can configure a VM with twelve vCPUs 322 on a host 120 having a $CPN^2$ of ten using two NUMA clients 312. NUMA scheduler 308 places both NUMA clients 312 on different NUMA nodes 166 and each NUMA client 312 includes six vCPUs 322 to distribute the workload equally. This type of configuration is referred to herein as a wide VM configuration (also referred to as a wide VM placement, wide VM, or WVM configuration/placement). If SMT is enabled on CPU(s) 160, a VM can have as many vCPUs 322 equal to the number of logical CPUs on host 120. NUMA scheduler 308 distributes vCPUs 322 across the available NUMA nodes 166 and trusts the CPU scheduler to allocate the required resources. For example, NUMA scheduler 308 can configure a 24 vCPU VM with two NUMA clients 312, each including 12 vCPUs 322 if deployed on a 10 $CPN^2$ host. This type of configuration is referred to herein as a high-density (HD) wide VM configuration (also referred to as an HID wide VM placement, HD wide VM, or HDWVM configuration/placement). Table 1 below illustrates the NUMA client configurations for a dual-socket 10 $CPN^2$ host (one NUMA node per socket):

TABLE 1

| | Narrow VM | Wide VM | HD Wide VM |
|---|---|---|---|
| Dual socket 10 $CPN^2$ | 1-10 vCPUs | 11-20 vCPUs | 21-40 CPUs |

Each NUMA client 312 includes a scheduling construct 316 and a presentation construct 318. Presentation construct 318 is used to inform guest OS 304 of the CPU and memory topology. Presentation construct 318 configuration is static and will not be changed regardless of the underlying host topology (e.g., in cases where VM is moved to a different host, presentation construct 318 does not change to match the new host's topology). Scheduling construct 316 is dynamic and changes to align with the physical layout of host 120. By default, NUMA scheduler 308 performs NUMA client sizing during the first power-on of the VM within cluster 118, which may potentially impact the performance of the VM throughout its existence. In embodiments, DRS 109 does not account for NUMA configuration for initial placement and load-balancing decisions. Rather, during initial placement, DRS accounts for VM configuration and resource reservations and selects the host with the lowest utilization and available unreserved resources. In a heterogeneous cluster configuration, without NUMA-aware clustering service 110, this can result in sub-optimal NUMA client configuration.

Figure 4A:
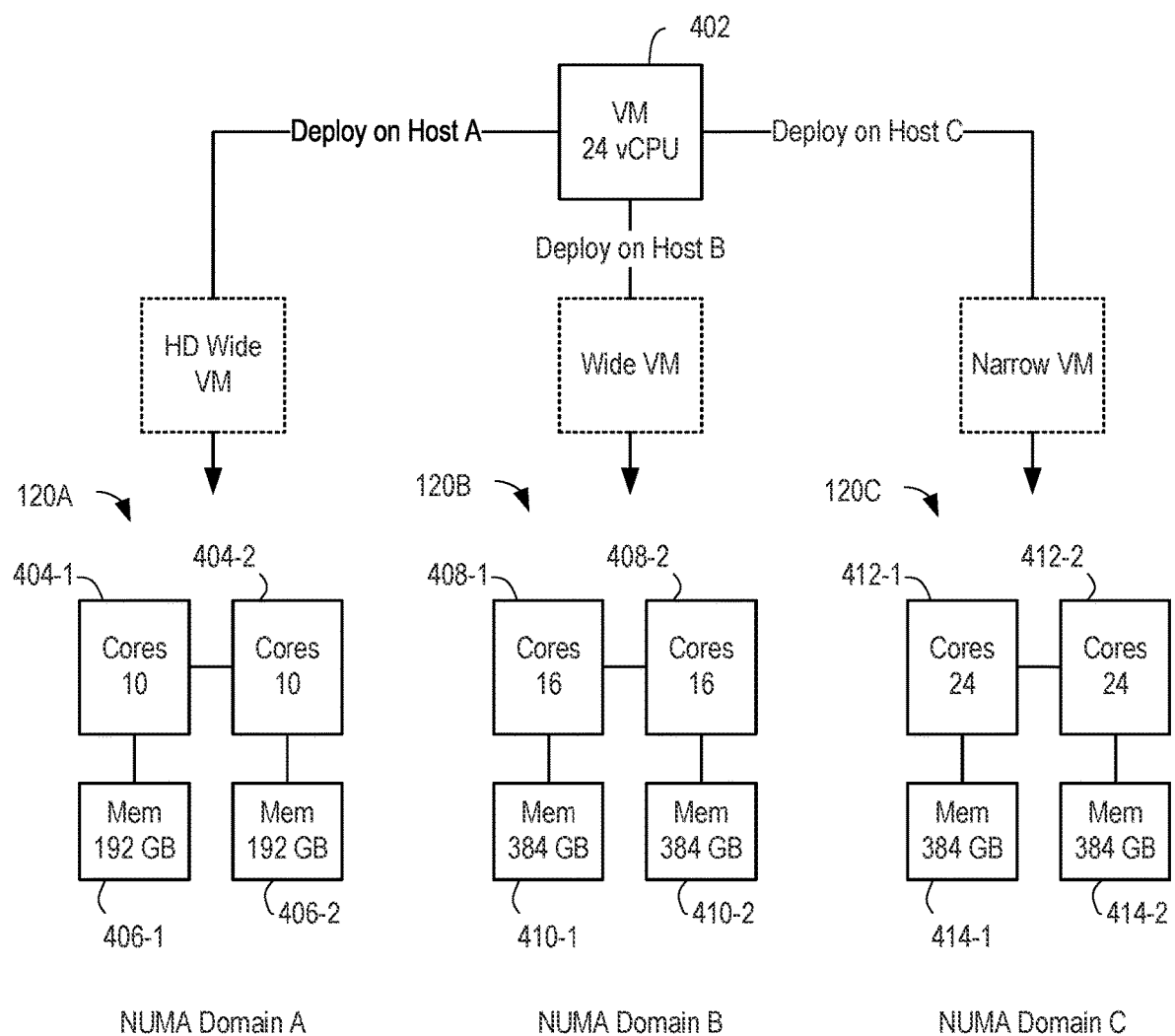
FIG. 4A is a block diagram depicting placement of a VM in a heterogenous cluster according to embodiments.

FIG. 4A is a block diagram depicting placement of a VM in a heterogenous cluster according to embodiments. In the example, a VM 402 being placed has 24 vCPUs. The heterogeneous cluster includes three NUMA domains designated A, B, and C. A host in NUMA domain A includes a $CPN^2$ of 10, a cores per host (CPH) of 20, and a memory capacity per NUMA node ($MCN^2$) of 192 gigabytes (GB). In the example, a host 120A includes NUMA, nodes 404-1 and 404-2 each having 10 cores. NUMA nodes 404-1 and 404-2 access local memories 406-1 and 406-2, respectively, each having a capacity of 192 GB. A host in NUMA domain B includes a $CPN^2$ of 16 cores, a CPH of 32, and an $MCN^2$ of 384 GB. In the example, a host 120B includes NUMA nodes 408-1 and 408-2 each having 16 cores. NUMA nodes 408-1 and 408-2 access local memories 410-1 and 410-2, respectively, each having a capacity of 384 GB. A host in NUMA domain C includes a $CPN^2$ of 24 cores, a CPH of 48, and an $MCN^2$ of 384 GB. In the example, a host 120C includes NUMA nodes 412-1 and 412-2 each having 24 cores. NUMA nodes 412-1 and 412-2 access local memories 414-1 and 414-2, respectively, each having a capacity of 384 GB. In the example, assume an SMT value of two hardware threads per core. In such case, from a logical CPU perspective, hosts in NUMA domain A include 20 logical CPUs, hosts in NUMA domain B include 64 logical CPUs, and hosts in NUMA domain C include 96 logical CPUs.

Deploying VM 402 on host 120A in NUMA domain A creates an HD wide VM configuration, possibly becoming a noisy neighbor for other workloads on the CPU. Deploying VM 402 on host 120B in NUMA domain B creates a wide VM configuration with surplus headroom for other workloads (e.g., two NUMA clients of 12 cores each). Deploying VM 402 on host 120C in NUMA domain C creates a narrow VM configuration, optimizing locality within one NUMA Client.

Figure 4B:
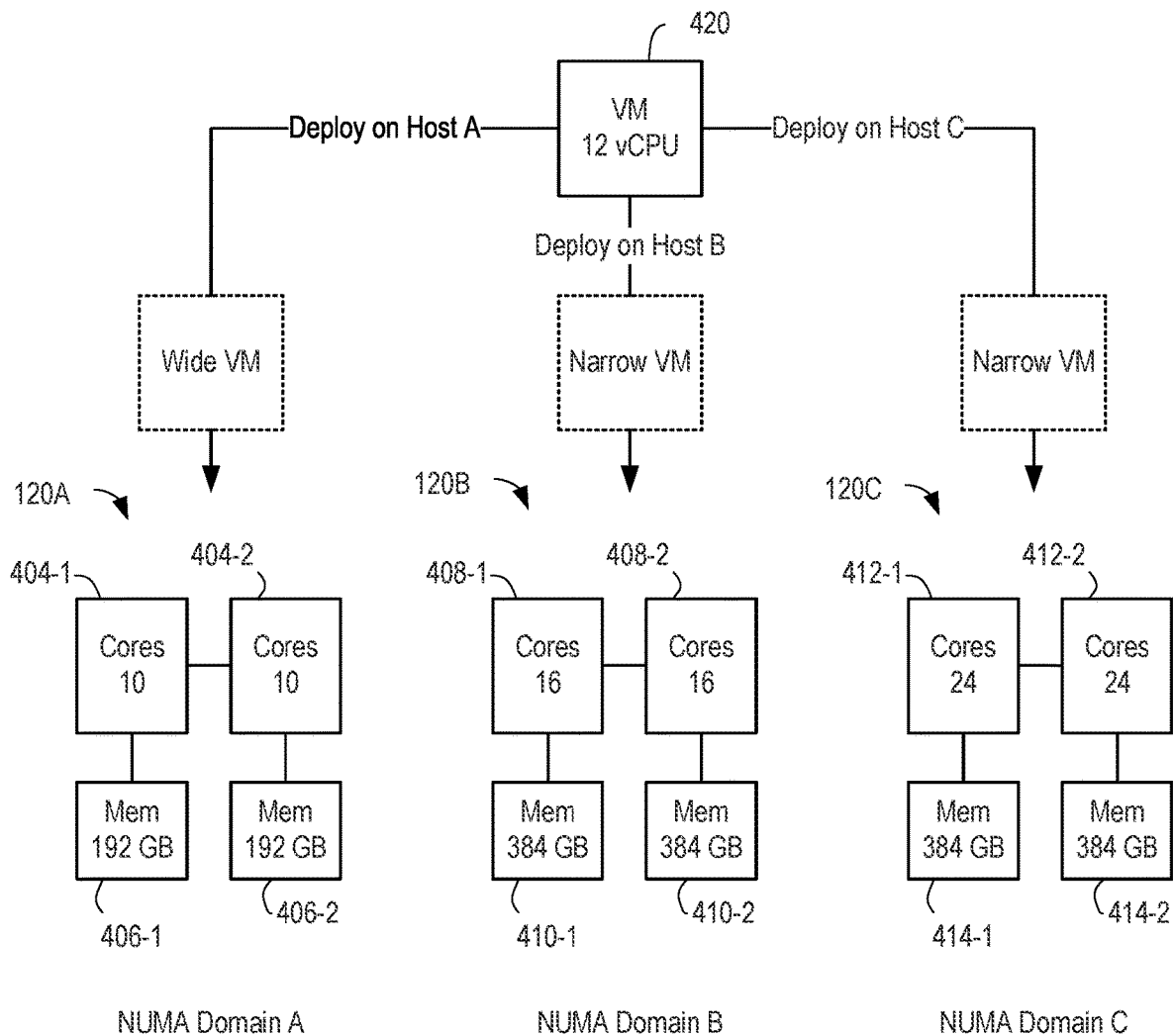
FIG. 4B is a block diagram depicting placement of another VM in a heterogenous cluster according to embodiments.

FIG. 4B is a block diagram depicting placement of another VM in a heterogeneous cluster according to embodiments. In the example of FIG. 4B, a VM 420 includes 12 vCPUs. The heterogenous cluster is configured as shown in FIG. 4A and described above. Deploying VM 420 on host 120A in NUMA domain A creates a wide VM configuration. Deploying VM 420 on host 120B in NUMA domain B, or host 120C in NUMA domain C, creates a narrow VM configuration.

Assume VM 420 is placed on host 120B or host 120C in a narrow VM configuration. Assume further that DRS 109 decides to move VM 420 within cluster for load-balancing. Absent NUMA-aware clustering service 110, DRS 109 makes a load-balancing decision that results in the best move to solve the cluster's balance while still offering the entitled resources for the VM on the destination host. DRS 109 by itself does not consider the impact of the NUMA node boundaries on the VM configuration. If DRS 109 moves VM 420 to host 120A in NUMA domain A to solve a cluster imbalance, VM 420 might get the same resources, but will be configured as a wide VM with its CPU and memory resources spread across two NUMA nodes. Thus, there will be an impact on latency and memory bandwidth. Further, the new VM configuration receives a faux-wide VM configuration since presentation construct 318 is static as described above. Only scheduling construct 316 is split into two NUMA clients 312 after the move.

During VM migration, presentation construct 318 cannot be Changed as this would severely interrupt operations of the guest OS in the VM. As a result, the VM configuration presents the guest OS and its applications a "uniform memory access" topology (narrow VM), while underneath the resources are sourced by two physical NUMA nodes. The guest OS and applications are not capable of applying NUMA optimizations, such as allocating a memory address range managed by the local memory controller, like they could if the VM was a regular wide VM where the presentation construct represents the host's physical layout.

Figure 5:
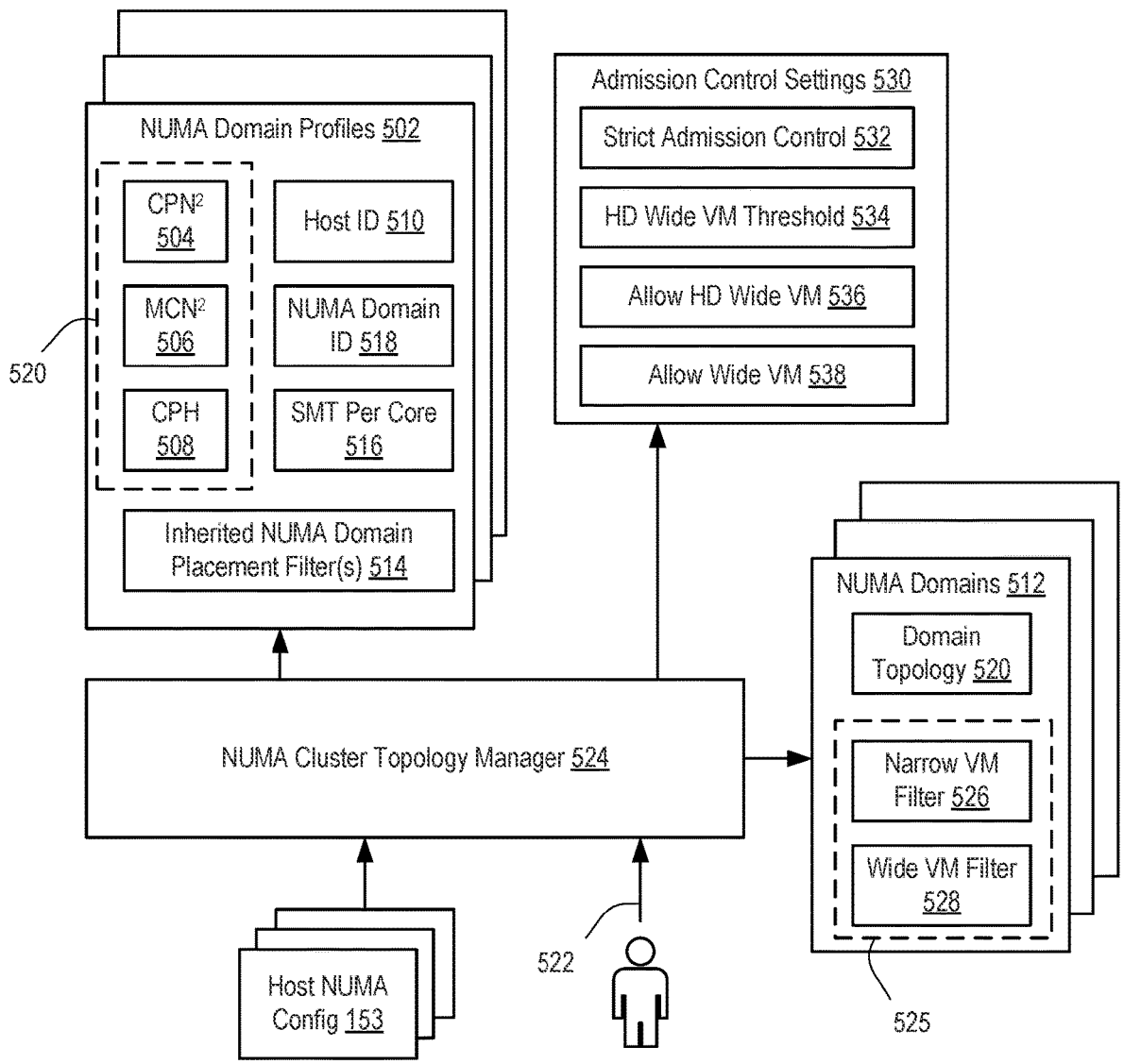
FIG. 5 is a block diagram depicting, data consumed and generated by a NUMA cluster topology manager executing as part of a NUMA-aware clustering service according to embodiments.

FIG. 5 is a block diagram depicting data consumed and generated by a NUMA cluster topology manager 524 executing as part of a NUMA aware clustering service 110 according to embodiments. NUMA cluster topology manager 524 is configured to obtain NUMA configurations 153 from hosts 120 in host cluster 118. Each NUMA configuration 153 describes the NUMA topology of its respective host 120, such as the number of cores per NUMA node, memory capacity per NUMA node, number of sockets, number of NUMA nodes per socket, and the like. NUMA cluster topology manager 524 processes NUMA configurations 153 and generates NUMA domain profiles (NDPs) 502. Each NDP 502 includes a $CPN^2$ 504, an $MCN^2$ 506, and information describing the NUMA node boundary ($N^2B$). The $N^2B$ can be described in various ways, such as by the number of sockets and the number of NUMA nodes per socket, the number of cores per host, or the like. In the embodiments described herein, the $N^2B$ is described by a CPH 508 (e.g., the number of NUMA nodes can be determined from CPH divided by $CPN^2$). Each NDP 502 can also include a host identifier (ID) 510 to identify the host with which the NDP is associated. In embodiments, NUMA configuration 153 can also specify the SMT configuration of the CPU(s). In such case, NDP 502 can also include an SMT per core 516 describing the number of hardware threads supported by each core.

In embodiments, $CPN^2$ 504, $MCN^2$ 506, and CPH 508 (or other $N^2B$ information) define a NUMA domain topology 520. Hosts with identical $CPN^2$, $MCN^2$, and CPH share the same NUMA domain topology 520. Accordingly, NUMA cluster topology manager 524 can define NUMA domains 512 each having a different NUMA domain topology 520. In the examples of FIGS. 4A and 4B, the heterogeneous cluster includes three NUMA domains designated A, B, and C. Each NDP 502 is thus associated with one of NUMA domains 512. In embodiments, each NDP 502 can include a NUMA domain ID 518 identifying a NUMA domain 512 associated with the respective NUMA topology 520 (e.g., NUMA domain A, B, or C as in the examples above).

The basic functionality of NUMA-aware clustering service 110 is to provide an optimal resource locality configuration for initial placement and load-balancing operations, which can be achieved based on generation of NDPs 502 and NUMA domains 512 as described above. NUMA-aware clustering service 110 reduces the number of hosts that DRS 109 reviews to find the best host with respect to free capacity and unreserved resources. In particular, NUMA-aware cluster service 110 operates to avoid placing a VM in a NUMA domain that results in an HD wide VM configuration if another NUMA domain placement results in a wide VM configuration. NUMA-aware clustering service 110 operates to avoid placing a VM in a NUMA domain resulting in a wide VM configuration if another NUMA domain placement results in a narrow VM configuration. NUMA-aware clustering service 110 operates to retain VM migration within a NUMA domain to avoid the transition of VM configuration, such as wide VM to HD wide VM, or wide VM to faux wide VM.

NUMA cluster topology manager 524 includes functionality that can further fine-tune placement of VMs, providing the ability to define headroom within NUMA nodes and hosts. Further, NUMA cluster topology manager 523 offers admission control options to restrict VM sizing configurations to avoid deploying HD wide VMs and high vCPU count VMs that would dominate all cores of a host or NUMA node.

In embodiments, NUMA cluster topology manager 524 accepts user input 522 to define placement filters 525 for each NUMA domain 512. Placement filters 525 allow the user to define the maximum number of vCPUs for narrow VMs and wide VMs at the NUMA domain level. Thus, the user can define a narrow VM filter 526 (also NVM filter), a wide VM filter 528 (also WVM filter), or both for one or more NUMA domains 512. Placement filters 525 assist NUMA-aware clustering service 110 in filtering out hosts if the VM vCPU count is deemed too large for that NUMA domain. In embodiments, narrow VM filter 526 constrains $CPN^2$ and wide VM filter 528 constrains CPH. Each NDP 502 inherits placement filters 525 defined for its respective NUMA domain 512 (inherited NUMA domain placement filters 514) so that placement filters 525 can be applied at the host-level during filtering operations discussed below. Table 2 shows example placement filter settings to establish headroom for the A-B-C heterogeneous cluster in the examples of FIGS. 4A and 4B described above.

TABLE 2

|  | NUMA Domain A | NUMA Domain B | NUMA Domain C |
| --- | --- | --- | --- |
| $CPN^2$ | 10 | 16 | 24 |
| Narrow VM filter | 8 | 14 | 22 |
| CPH | 20 | 32 | 48 |
| Wide VM filter | 18 | 30 | 46 |

The basic functionality of NUMA-aware clustering service 110 is to optimize locality. If a 12 vCPU VM is powered on, NUMA-aware clustering service 110 will filter out the hosts in NUMA domain A, as this VM can be configured as a narrow VM (max locality) on hosts in NUMA domains B and C. However, a user can define placement filters 525 to establish headroom. If a 10 vCPU VM is powered-on, NUMA-aware clustering service 110 will filter out hosts in NUMA domain A, as this VM would dominate all cores if placed on a host in NUMA domain A (given a narrow VM filter of 8 $CPN^2$). Narrow VM filter 526 protects the hosts at cluster-level placement from dealing with noisy neighbors.

Placement of a 45 or 46 vCPU VM depends on the admission control functionality discussed below. If strict admission control has not been enabled by the user (i.e., wide VM filters are not applied), NUMA-aware clustering service 110 can filter out hosts in NUMA domains A and B and allow placement on a host in NUMA domain C. This choice is still the most optimal placement from a performance perspective and a noisy neighbor perspective. Placing such a VM in the other NUMA domains would result in an HD wide VM configuration, resulting in use of multiple SMT threads per core. If, however, the user has enabled strict admission control (e.g., wide VM filters are applied), NUMA-aware clustering service 110 filters out all hosts in all NUMA domains A, B, and C, as such a VM does not satisfy any wide VM filter in Table 2 above.

NUMA-aware clustering service 110 also provides narrow VM memory locality optimization. This functionality filters the hosts with $MCN^2$ that can provide memory locality for the VM memory configuration of narrow VMs. For example, a VM with eight vCPUs and 256 GB memory can be placed in any of NUMA domains A, B, and C in the example above, as such a VM does not exceed any narrow VM filter threshold. However, if DRS 109 placed such a VM on a host in NUMA domain A, its 256 GB memory configuration would be spread across two NUMA nodes, since $MCN^2$ of NUMA domain A is only 192 GB. Memory locality optimization is relevant for narrow VMs only, as wide VMs and HD wide VMs will have their memory access distributed across multiple NUMA, nodes by definition.

The admission control functionality allows admins/operations managers to restrict VM configurations in order to control the consumption generated by workloads deployed via self-service mechanisms. In embodiments, NUMA cluster topology manager 524 accepts user input 522 to adjust admission control settings 530. A user can enable/disable strict admission control 532. Strict admission control 532 is a user-controllable option that, when enabled, uses the wide VM filter values as limits for VM vCPU configurations. As a result, the wide. VM filter on NUMA domain C in the example above (46) determines that VMs with vCPU counts beyond 46 are rejected. The combination of enabling strict admission control 532 and defining wide VM filter(s) 528 results in the loss of the ability to create HD wide VMs. This admission control setting is useful to avoid VMs that span all cores and a multitude of SMT threads.

A user can establish an HD wide VM threshold 534 (also referred to as HDWVM threshold) if strict admission control 532 is disabled. HD wide VM threshold 534 allows the user to control the maximum size of an HD wide VM. NUMA-aware clustering service 110 rejects VMs with vCPU counts greater than HIS wide VM threshold 534. This admission control setting acts as a strict admission control function for only BID wide VMs.

A user can enable/disable allow HD wide VM 536. In some cases, a user wants to provide maximum sizing range for narrow VMs and wide VMs but does not want the creation of HD wide VMs. Allow HD wide VM 536 is a Boolean function (e.g., enabled by default) that the user can use to control extreme VM sizes.

A user can enable/disable allow wide VM 538. Some users may want to allow only narrow VM configurations within their clusters. Allow wide VM 538 is a Boolean function enabled by default) that the user can use to allow or prevent creation of wide VMs.

Table 3 below summarizes admission control settings 530 and their effects.

TABLE 3

| Setting | Effect |
| --- | --- |
| Strict Admission Control | When enabled, wide VM filter determines maximum VM vCPU size, no HD wide VM possible |
| HD Wide VM Threshold | Threshold determines maximum HD Wide VM size, headroom for Wide-VMs in largest NUMA domain not strictly enforced |
| Allow HD Wide VMs | If disabled, rejects the creation of High-Density Wide VMs |

TABLE 3-continued

| Setting | Effect |
| --- | --- |
| Allow Wide VMs | If disabled, rejects the creation of Wide VMs |

Figure 6:
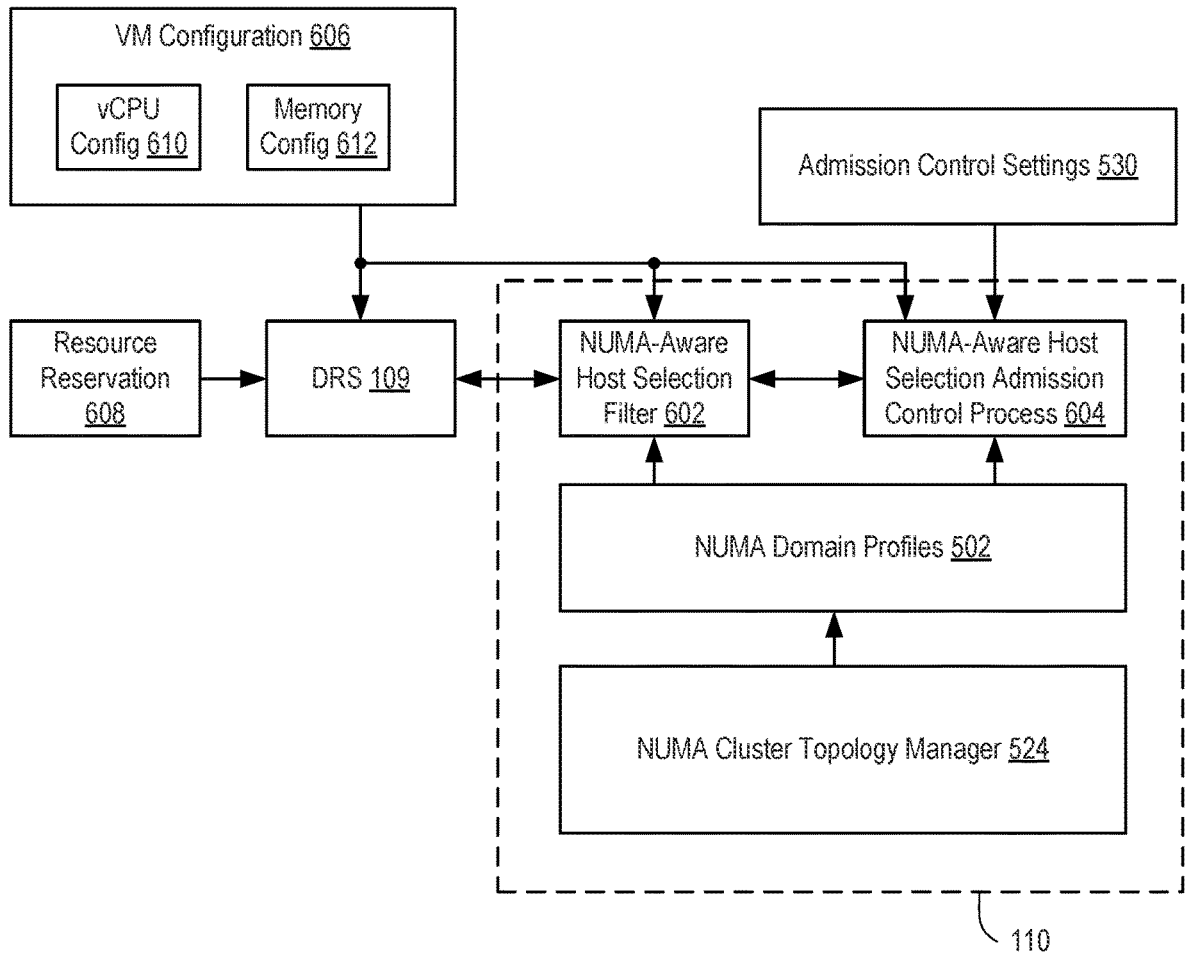
FIG. 6 is a block diagram depicting interaction between components of a NUMA-aware clustering service and a distributed resource scheduler (DRS) according to embodiments.

FIG. 6 is a block diagram depicting interaction between components of NUMA-aware clustering service 110 and DRS 109 according to embodiments. NUMA-aware clustering service 110 includes NUMA cluster topology manager 524, NUMA-aware host selection filter 602 and NUMA-aware host section admission control process 604. NUMA cluster topology manager 524 functions as discussed above to generate NDPs 502 and to establish by delimit and/or through user interaction admission control settings 530. NUMA-aware host selection filter 602 registers with DRS 109 and receives notifications for VM placement and VM load-balancing operations. NUMA-aware host selection filter 602 cooperates with NUMA-aware host selection admission control process 604 to filter hosts 120 in cluster 118 and generate a list of selected hosts with optimal NUMA configurations. NUMA-aware host selection filter 602 provides a host list to DRS 109 for each operation, from which DRS 109 selects a host for the VM operation. As discussed above, DRS 109 performs placement and load-balancing based on VM configuration 606 and resource reservations 608. VM configuration 606 includes vCPU configuration 610 and memory configuration 612. vCPU configuration 610 includes the number of vCPUs allocated to the VM. Memory configuration 612 includes the amount of memory allocated to the VM. Both NUMA-aware host selection filter 602 and NUMA-aware host selection admission control process 604 make use of vCPU configuration 610 and memory configuration 612 of VM configuration 606 during operations, as discussed further below.

Figure 7A:
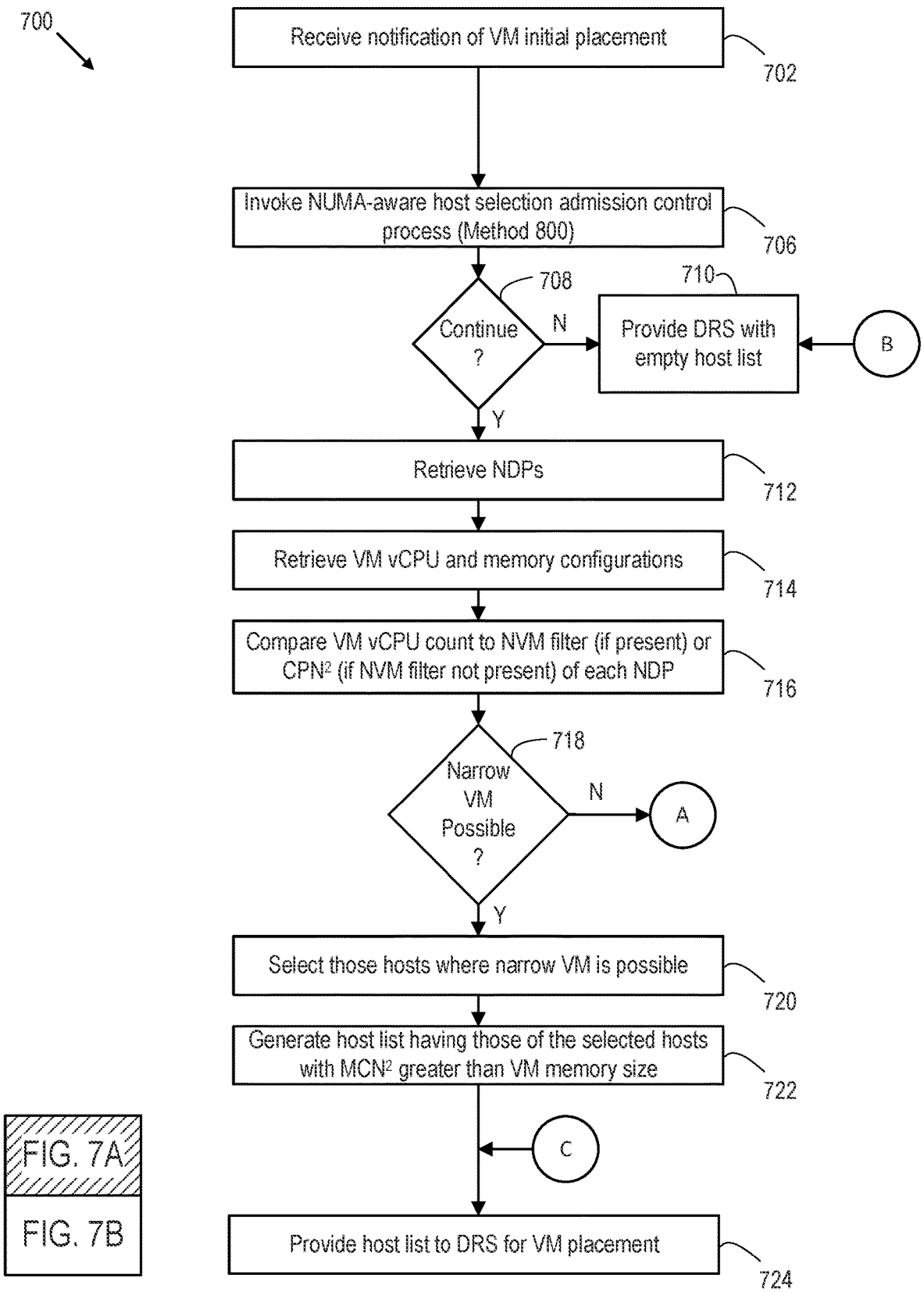
FIG. 7A-7B are a combined flow diagram depicting a method of filtering hosts in a host cluster based on NUMA configuration of such hosts for placement of a VM according to embodiments.
Figure 7B:
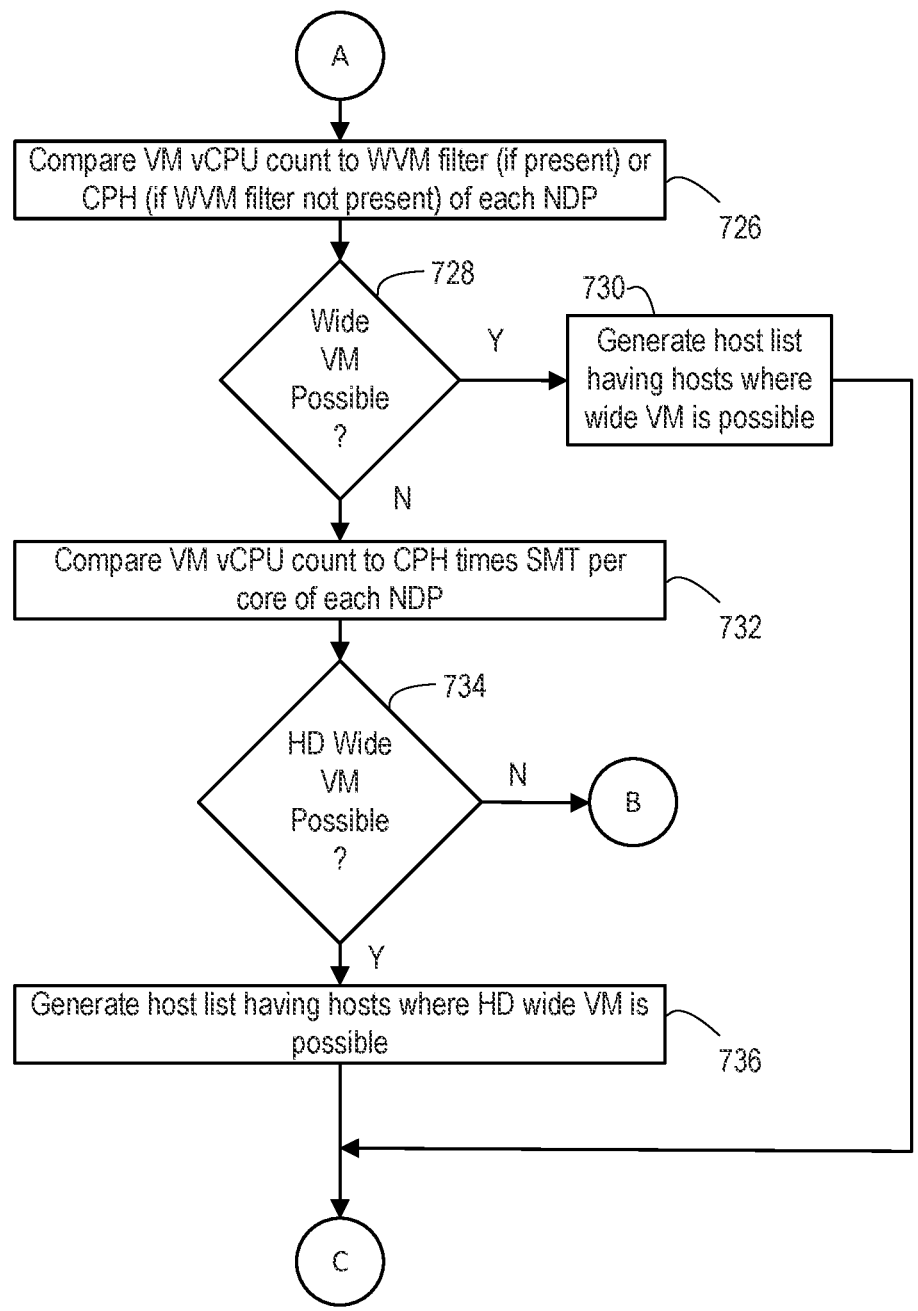

FIGS. 7A-B are a combined flow diagram depicting a method 700 of filtering hosts in a host cluster based on NUMA configuration of such hosts for initial placement of a VM according to embodiments. NUMA-aware clustering service 110 executes method 700 to generate a list of hosts for DRS 109 when performing a VM placement operation. Method 700 begins at step 702, where NUMA-aware host selection filter 602 receive a notification of VM placement (e.g., from DRS 109). At step 706, NUMA-aware host selection filter 602 invokes NUMA-aware host selection admission control process 604 to determine if the VM placement operation is permitted based on current admission control settings 530. A method 800 for performing step 706 is described below.

Figure 8:
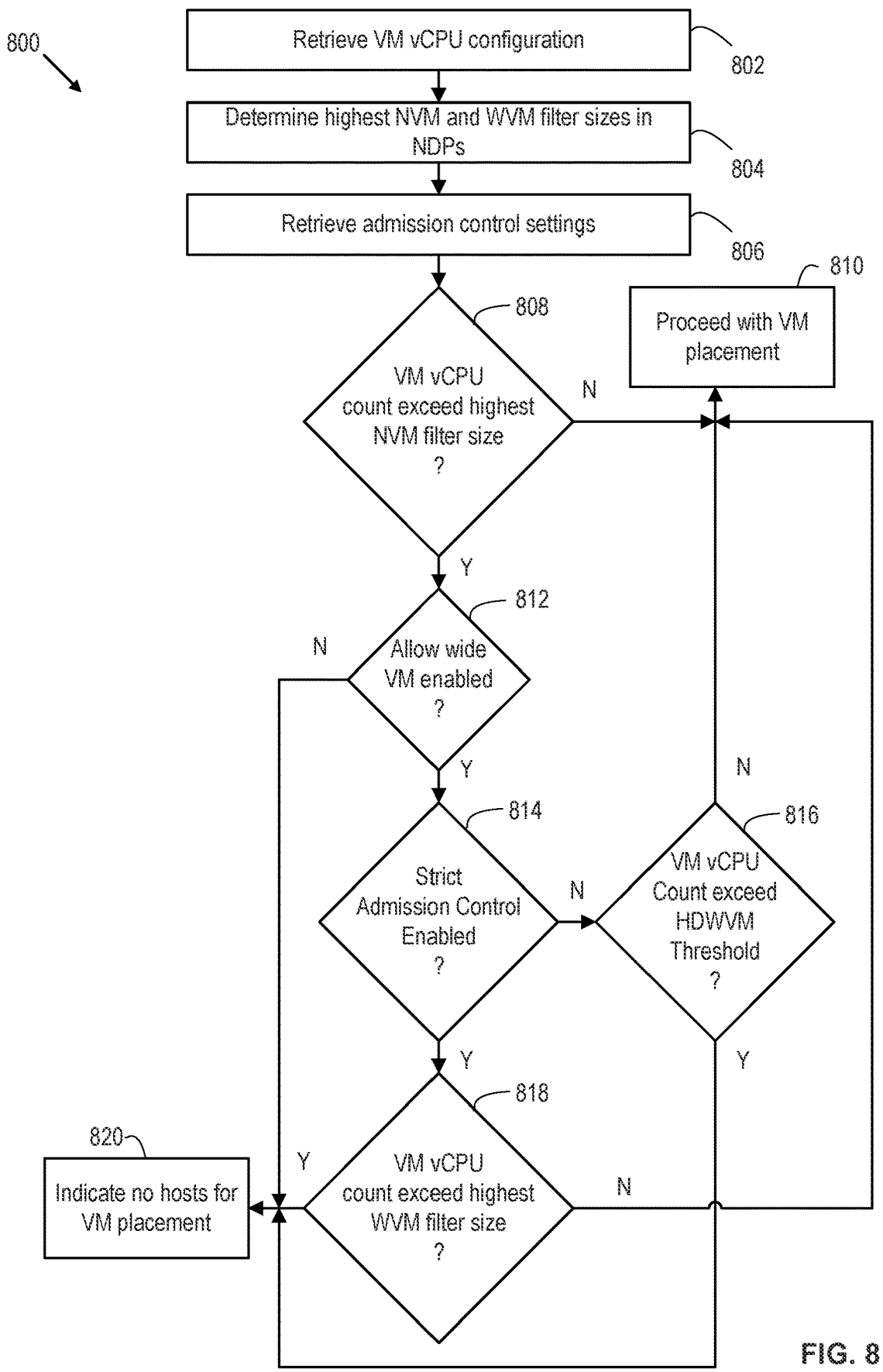
FIG. 8 is a flow diagram depicting a method of verifying a VM placement operation based on NUMA-based admission control settings according to an embodiment.

FIG. 8 is a flow diagram depicting a method 800 of verifying a VM initial placement operation based on NUMA-based admission control settings according to an embodiment. NUMA-aware host selection admission control process 604 executes method 800 to determine if a requested VM placement operation can proceed. Method 800 begins at step 802, where NUMA-aware host selection admission control process 604 retrieves vCPU configuration 610 for the VM being placed from the VM configuration 606. At step 804, NUMA-aware host selection admission control process 604 determines the highest NVM and WVM filter settings in NDPs 502. In the example shown in Table 2 above, the highest NVM filter setting is 22 and the highest WVM filter setting is 46. At step 806, NUMA-aware host selection admission control process 604 retrieves admission control settings 530.

At step 808, NUMA-aware host selection admission control process 604 determines if the VM vCPU count exceeds the highest NVM filter setting. If not, the VM can be placed in the cluster has a narrow VM. Method 800 proceeds to step 810 and proceeds with VM placement. If at step 808 the vCPU count exceeds the highest NVM filter setting, the VM can only be placed as a wide VM or HD wide VM. Method 800 proceeds instead to step 812.

At step 812, NUMA-aware host selection admission control process 604 determines if allow wide VM setting 538 has been enabled. If not, method 800 proceeds to step 820, where NUMA-aware host selection admission control process 604 indicates there are no hosts in which the VM can be placed. Method 800 reaches step 812 if the VM requires wide VM or HD wide VM placement. If wide VM placement is disabled, then the cluster is configured for only narrow VMs and thus there are no available hosts for this VM. If at step 812 allow wide VM setting 538 is enabled, method 800 proceeds to step 814.

At step 814, NUMA-aware host selection admission control process 604 determines if strict admission control 532 has been enabled. If not, method 800 proceeds to step 816. When strict admission control 532 is disabled, both wide VM and HD wide VM configurations are possible. At step 816, NUMA-aware host selection admission control process 604 determines whether the VM vCPU count exceeds HD wide VM threshold 534. If not, method 800 proceeds to step 810 and proceeds with VM placement. If VM vCPU count exceeds HD wide VM threshold 534, method 800 proceeds instead to step 820, where NUMA-aware host selection admission control process 604 indicates there are no hosts in which the VM can be placed.

If at step 814 strict admission control 532 has been enabled, method 800 proceeds instead to step 818. At step 818, NUMA-aware host selection admission control process 604 determines whether VM vCPU count exceeds the highest WVM filter setting. If so, method 800 proceeds to step 820 where NUMA-aware host selection admission control process 604 indicates there are no hosts in which the VM can be placed. If VM vCPU count does not exceed the highest WVM filter setting, method 800 proceeds to step 810 and indicates placement can proceed.

Returning to method 700, at step 708, NUMA-aware host selection filter 602 determines if placement of VM can continue based on the result from NUMA-aware host selection admission control process 604. If not, method 700 proceeds to step 710, where NUMA-aware host selection filter 602 provides DRS 109 with an empty host list. If placement can continue, method 700 instead proceeds to step 712.

At step 712, NUMA-aware host selection filter 602 retrieves NDPs 502 generated by NUMA cluster topology manager 524. At step 714, NUMA aware host selection filter 602 retrieves VM vCPU and memory configurations 610, 612. At step 716, NUMA-aware host selection filter 602 compares the VM vCPU count to the NVM filter (if present) or $CPN^2$ (if NVM filter is not present) in each NDP 502. In step 716, NUMA-aware host selection filter 602 determines which hosts have a NUMA configuration that supports a narrow VM configuration, which requires vCPU count to be no greater than $CPN^2$ of the host or the NVM filter applied to the host if present. At step 718, NUMA-aware host selection filter 602 determines if a narrow VM placement is possible based on the comparison results of step 716. If so, method 700 proceeds to step 720, where NUMA-aware host selection filter 602 selects all hosts that support a narrow VM placement.

At step 722, NUMA-aware host selection filter 602 generates a host list have those hosts selected in step 720 that also have an $MCN^2$ greater than the VM memory size. This can be all host selected in step 720 or less than all hosts depending on their $MCN^2$ values. As discussed above, NUMA-aware clustering service 110 operates to achieve memory locality in narrow VM configurations. At step 724, NUMA-aware host selection filter 602 provides a host list to DRS 109 for VM placement.

If at step 718 a narrow VM placement is not possible based on the comparison results of step 716, method 700 instead proceeds to step 726. At step 726, NUMA-aware host selection filter 602 compares the VM vCPU count to the WVM filter (if present) or the CPH (if WVM filter is not present) for each NDP 502. In step 726, NUMA-aware host selection filter 602 determines which hosts have a NUMA configuration that supports a wide VM configuration, which requires vCPU count to be no greater than CPH of the host or the WVM filter applied to the host if present. At step 728, NUMA-aware host selection filter 602 determines whether a wide VM placement is possible. If so, method 700 proceeds to step 730, where NUMA-aware host selection filter 602 generates a list of hosts supporting a wide VM placement from the comparison results at step 726. Method 700 proceeds from step 730 to step 724 described above.

If at step 728 NUMA-aware host selection filter 602 determines that a wide VM placement is not possible, method 700 proceeds to step 732. At step 732, NUMA-aware host selection filter 602 compares the VM vCPU count to CPH times SMT per core of each NDP. In step 732, NUMA-aware host selection filter 602 determines which hosts support an HD wide VM placement. At step 734, NUMA-aware host selection filter 602 determines if an HD wide VM placement is possible. If not, method 700 proceeds to step 710 described above, where NUMA-aware host selection filter 602 provides an empty host list to DRS 109. If an HD wide VM placement is supported, method 700 instead proceeds to step 736. At step 736, NUMA-aware host selection filter 602 generates a host list having hosts that support an HD wide VM placement for the VM based on the comparison results of step 732. Method proceeds from step 736 to step 724 described above, where NUMA-aware host selection filter 602 sends the host list to DRS 109 for VM placement.

Figure 9:
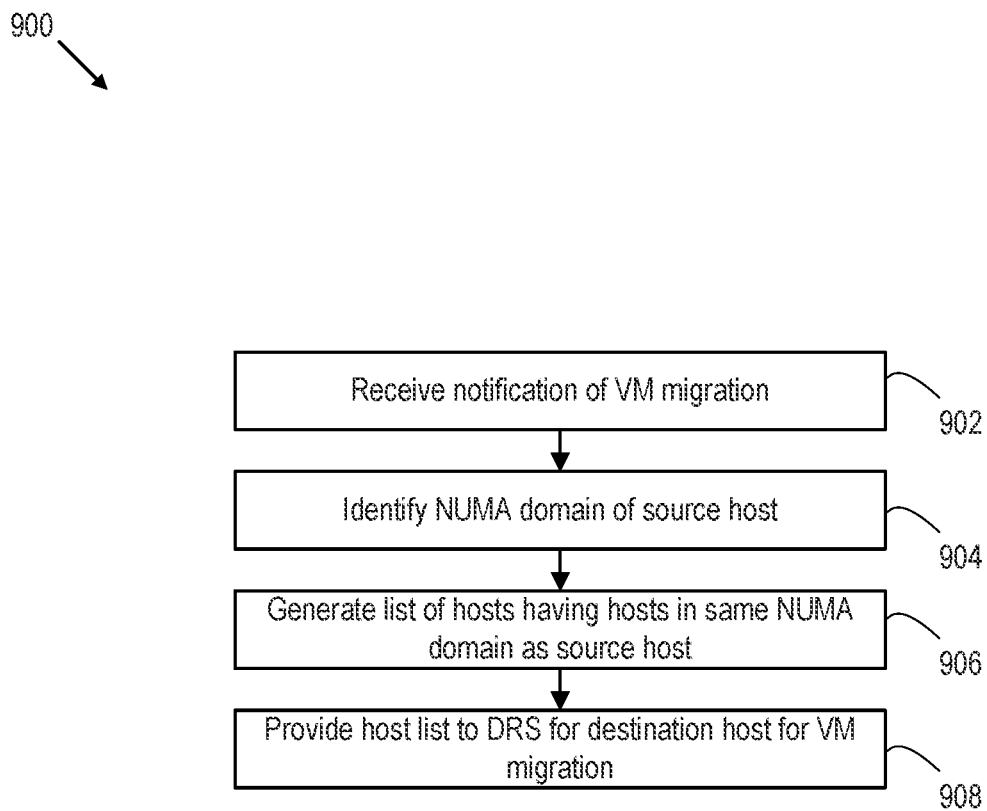
FIG. 9 is a flow diagram depicting a method of filtering hosts in a host cluster based on NUMA configuration of such hosts for migration of a VM according to embodiments.

FIG. 9 is a flow diagram depicting a method 900 of filtering hosts in a host cluster based on NUMA configuration of such hosts for migration of a VM according to embodiments. NUMA-aware clustering service 110 executes method 900 to generate a list of hosts for DRS 109 when performing a VM migration operation. Method 900 begins at step 902, where NUMA-aware host selection filter 602 receive a notification of VM migration (e.g., from DRS 109). At step 904, NUMA-aware host selection filter 602 identifies the NUMA domain of the source host having the VM (e.g., by searching NPDs 502 using the host identifier). At step 906, NUMA-aware host selection filter 602 generates a list of hosts having hosts in the same NUMA domain as the source host. At step 908, NUMA-aware host selection filter 602 provides the host list to DRS 109 for determining the destination host of the VM migration. The NUMA domain acts as a load-balancing boundary for DRS 109. Only hosts that are a part of the same NUMA domain are compatible destination hosts for load-balancing operations. By having a filtered list of hosts of the same domain, the NUMA Client configuration of the VM remains valid for any destination host DRS 109 selects.

Optimizing VM NUMA configuration and workload placement in a heterogeneous cluster has been described. Embodiments include techniques for placing a VM in a cluster of hosts, each having a hypervisor managed by a virtualization management server for the cluster. The cluster is heterogeneous in that the hosts are separated into a plurality of NUMA domains. The placement techniques include comparing a vCPU and memory configuration of the VM with physical NUMA topologies of the hosts (e.g., stored in NDPs). A set of hosts is selected that spans at least one of the NUMA domains. Each host in the set of hosts has a physical NUMA topology that maximizes locality for vCPU and memory resources of the VM as specified by the vCPU and memory configuration of the VM. Maximum locality is achieved with a narrow VM configuration. If a narrow VM configuration cannot be achieved, locality is maximized using a wide VM configuration. If a wide VM configuration cannot be achieved, locality is maximized using an HD wide VM configuration. The set of hosts is provided to DRS, which places the VM in a host selected from the set of hosts.

Further techniques include collecting NUMA configurations from the host and generating NUMA domain profiles (NDPs) for the hosts. Further techniques include establishing placement filters in response to user input. One or more placement filters can be defined for each NUMA domain. Placement filters can be used to provide headroom for narrow VM and wide VM configurations. Further techniques include establishing admission control settings as a default and/or in response to user input. Admission control settings can determine whether a VM can be placed in the cluster based on a set of constraints (e.g., whether vCPU count satisfies placement filters, whether wide VM or HD wide VM configurations are enabled, etc.).

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method comprising:
providing a cluster of hosts to a distributed resource scheduler (DRS) executing in a virtualization management server, the virtualization management server managing hypervisors executing in the cluster of hosts, the cluster of hosts separated into a plurality of non-uniform memory access (NUMA) domains, each host in the cluster of hosts having a physical NUMA topology for virtual central processing unit (vCPU) and memory resources of a virtual machine (VM) as specified in a vCPU and memory configuration of the VM, each host in the cluster of hosts having more cores per host than a number of vCPUs of the VM by an amount dictated by a placement filter for the VM;
deploying, by the DRS, the VM on a first host in the cluster of hosts based on an indication of a type of the placement filter, the vCPU and memory configuration of the VM, and the physical NUMA topology of the first host; and
executing, by the DRS through communication with the hypervisor of the first host, the VM on the physical NUMA topology of the first host, the first host spanning at least one of the NUMA domains.

2. The method of claim 1, wherein the
deploying is further based on, for each of the physical NUMA topologies, a number of vCPUs of the VM and a number of cores per NUMA node;
wherein each host in the cluster of hosts has a respective number of cores per NUMA node greater than or equal to the number of vCPUs.

3. The method of claim 2, wherein each host in the cluster of hosts has a respective memory capacity per NUMA node greater than a memory size of the VM.

4. The method of claim 1, wherein, for each of the physical NUMA topologies, a number of cores per NUMA node is less than a number of vCPUs of the VM, and wherein the
deploying is further based on, for each of the physical NUMA topologies, the number of vCPUs and a number of cores per host;
wherein each host in the cluster of hosts has a respective number of cores per host greater than or equal to the number of vCPUs.

5. The method of claim 1, wherein, for each of the physical NUMA topologies, a number of cores per host is less than a number of vCPUs of the VM, and wherein the
deploying is further based on, for each of the physical NUMA topologies, the number of vCPUs with a number of cores per host times a number of simultaneous multithreading (SMT) threads;
wherein each host in the cluster of hosts has a respective number of cores per host times the number of SMT threads greater than or equal to the number of vCPUs.

6. The method of claim 1, wherein:
the plurality of NUMA domains is associated with a plurality of placement filters including the placement filter, the placement filter being a narrow VM filter; and
each host in the cluster of hosts has a respective number of cores per NUMA node greater than a number of vCPUs of the VM by an amount no less than a difference between the respective number of cores per NUMA node and the narrow VM filter.

7. The method of claim 1, wherein:
the plurality of NUMA domains is associated with a plurality of placement filters including the placement filter, the placement filter being the wide VM filter; and
each host in the cluster of hosts has a respective number of cores per host greater than a number of vCPUs of the VM by an amount no less than a difference between the respective number of cores per host and the wide VM filter.

8. A non-transitory computer readable medium comprising instructions to be executed in a computing device to cause the computing device to execute a method comprising:
providing a cluster of hosts to a distributed resource scheduler (DRS) executing in a virtualization management server, the virtualization management server managing hypervisors executing in the cluster of hosts, the cluster of hosts separated into a plurality of non-uniform memory access (NUMA) domains, each host in the cluster of hosts having a physical NUMA topology for virtual central processing unit (vCPU) and memory resources of a virtual machine (VM) as specified in a vCPU and memory configuration of the VM, each host in the cluster of hosts having more cores per host than a number of vCPUs of the VM by an amount dictated by a placement filter for the VM;
deploying, by the DRS, the VM on a first host in the cluster of hosts based on an indication of a type of the placement filter, the vCPU and memory configuration of the VM, and the physical NUMA topology of the first host; and
executing, by the DRS through communication with the hypervisor of the first host, the VM on the physical NUMA topology of the first host, the first host spanning at least one of the NUMA domains.

9. The non-transitory computer readable medium of claim 8, wherein the
deploying is further based on, for each of the physical NUMA topologies, a number of vCPUs of the VM and a number of cores per NUMA node;
wherein each host in the cluster of hosts has a respective number of cores per NUMA node greater than or equal to the number of vCPUs.

10. The non-transitory computer readable medium of claim 9, wherein each host in the cluster of hosts has a respective memory capacity per NUMA node greater than a memory size of the VM.

11. The non-transitory computer readable medium of claim 8, wherein, for each of the physical NUMA topologies, a number of cores per NUMA node is less than a number of vCPUs of the VM, and wherein the
deploying is further based on, for each of the physical NUMA topologies, the number of vCPUs and a number of cores per host;
wherein each host in the cluster of hosts has a respective number of cores per host greater than or equal to the number of vCPUs.

12. The non-transitory computer readable medium of claim 8, wherein, for each of the physical NUMA topologies, a number of cores per host is less than a number of vCPUs of the VM, and wherein the
deploying is further based on, for each of the physical NUMA topologies, the number of vCPUs with a number of cores per host times a number of simultaneous multithreading (SMT) threads;
wherein each host in the cluster of hosts has a respective number of cores per host times the number of SMT threads greater than or equal to the number of vCPUs.

13. The non-transitory computer readable medium of claim 8, wherein:
the plurality of NUMA domains is associated with a plurality of placement filters including the placement filter, the placement filter being a narrow VM filter; and
each host in the cluster of hosts has a respective number of cores per NUMA node greater than a number of vCPUs of the VM by an amount no less than a difference between the respective number of cores per NUMA node and the narrow VM filter.

14. The non-transitory computer readable medium of claim 8, wherein:
the plurality of NUMA domains is associated with a plurality of placement filters including the placement filter, the placement filter being the wide VM filter; and
each host in the cluster of hosts has a respective number of cores per host greater than a number of vCPUs of the VM by an amount no less than a difference between the respective number of cores per host and the wide VM filter.

15. A computer, comprising:
a processor and a memory; and
virtualization management software stored in the memory and executing on the processor, the virtualization management software configured to manage hypervisors executing in a cluster of hosts, the cluster of hosts separated into a plurality of nonuniform memory access (NUMA) domains, each host in the cluster of hosts having a physical NUMA topology for virtual central processing unit (vCPU) and memory resources of a virtual machine (VM) as specified in a vCPU and memory configuration of the VM, each host in the cluster of hosts having more cores per host than a number of vCPUs of the VM by an amount dictated by a placement filter for the VM, the virtualization management software including a distributed resource scheduler (DRS) and a NUMA-aware clustering service, the NUMA-aware clustering service configured to:
provide the cluster of hosts to the DRS; and
wherein the DRS is configured to:
deploy the VM on a first host in the cluster of hosts based on an indication of a type of the placement filter, the vCPU and memory configuration of the VM, and the physical NUMA topology of the first host; and
execute, through communication with the hypervisor of the first host, the VM on the physical NUMA topology of the first host spanning at least one of the NUMA domains.

16. The computer of claim 15, wherein the NUMA-aware clustering service is configured to:
deploy further based on, for each of the physical NUMA topologies, a number of vCPUs of the VM with a number of cores per NUMA node;
wherein each host in the cluster of hosts has a respective number of cores per NUMA node greater than or equal to the number of vCPUs.

17. The computer of claim 15, wherein, for each of the physical NUMA topologies, a number of cores per NUMA node is less than a number of vCPUs of the VM, and wherein the NUMA-aware clustering service is configured to:
deploy further based on, for each of the physical NUMA topologies, the number of vCPUs with a number of cores per host;
wherein each host in the cluster of hosts has a respective number of cores per host greater than or equal to the number of vCPUs.

18. The computer of claim 15, wherein, for each of the physical NUMA topologies, a number of cores per host is less than a number of vCPUs of the VM, and wherein the NUMA-aware clustering service is configured to:
deploy further based on, for each of the physical NUMA topologies, the number of vCPUs with a number of cores per host times a number of simultaneous multithreading (SMT) threads;
wherein each host in the cluster of hosts has a respective number of cores per host times the number of SMT threads greater than or equal to the number of vCPUs.

19. The computer of claim 15, wherein:
the plurality of NUMA domains is associated with a plurality of placement filters including the placement filter, the placement filter being a narrow VM filter; and
each host in the cluster of hosts has a respective number of cores per NUMA node greater than a number of vCPUs of the VM by an amount no less than a difference between the respective number of cores per NUMA node and the narrow VM filter.

20. The computer of claim 15, wherein:
the plurality of NUMA domains is associated with a plurality of placement filters including the placement filter, the placement filter being the wide VM filter; and
each host in the cluster of hosts has a respective number of cores per host greater than a number of vCPUs of the VM by an amount no less than a difference between the respective number of cores per host and the wide VM filter.

* * * * *